Dec. 17, 1946. J. M. TYRNER 2,412,660
GRAVITY-FEED ARC-WELDING APPARATUS
Filed July 7, 1944 3 Sheets-Sheet 1
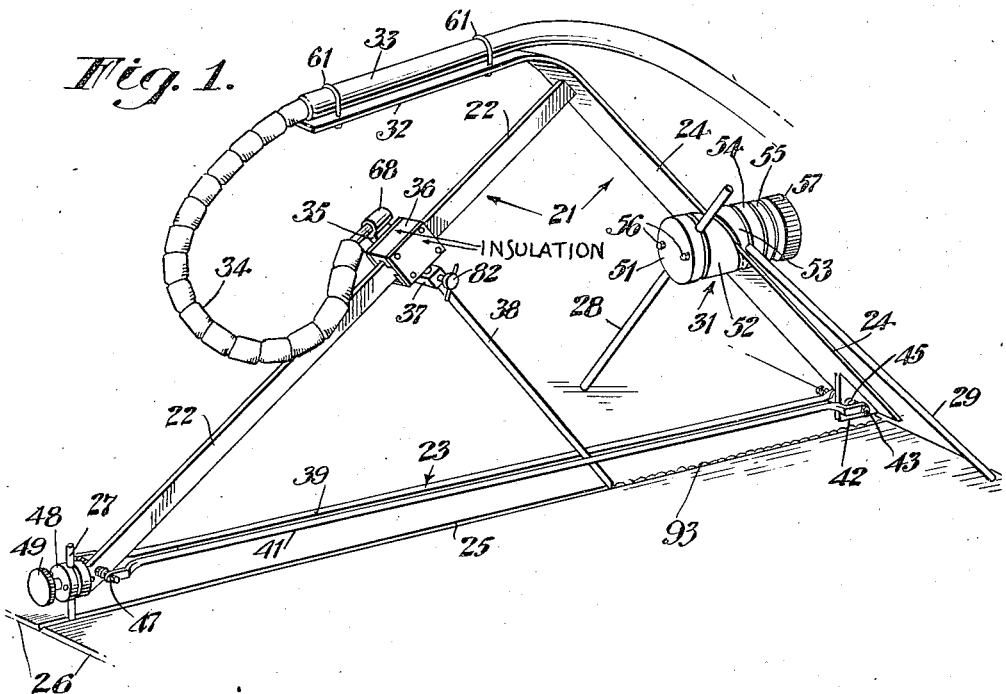
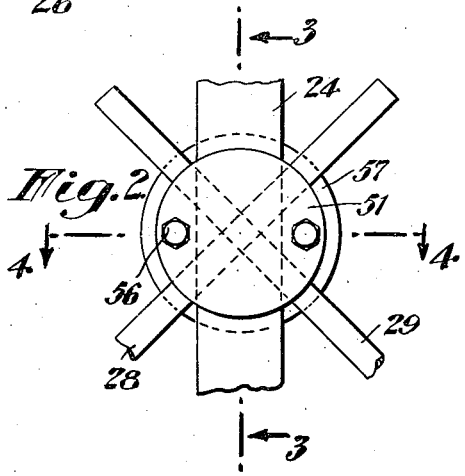
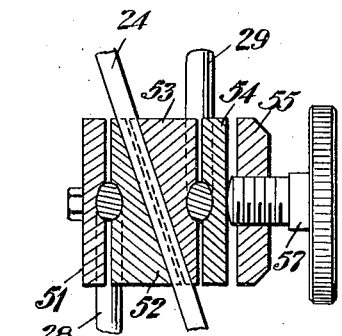
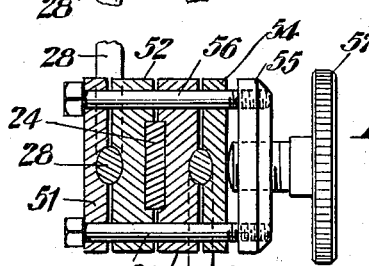
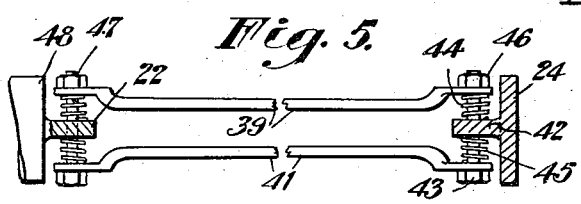
INVENTOR.
JOSEPH M. TYRNER
BY Pennie, Davis, Marvin & Edmonds
Attorneys Dec. 17, 1946.                J. M. TYRNER                2,412,660
                    GRAVITY-FEED ARC-WELDING APPARATUS
                  Filed July 7, 1944          3 Sheets-Sheet 2
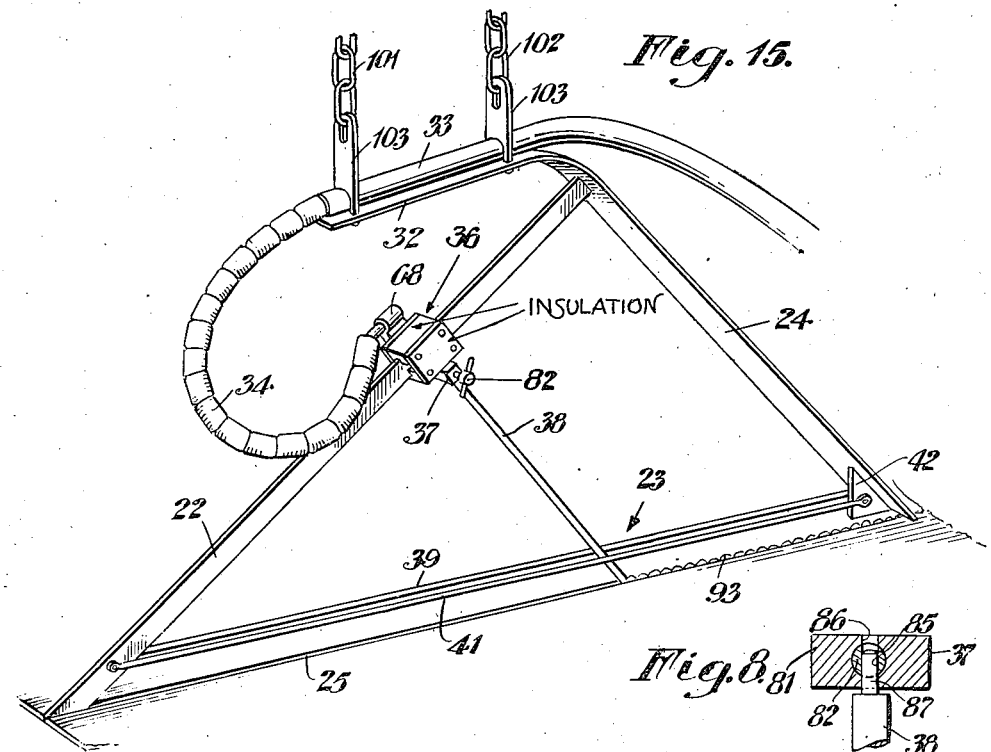
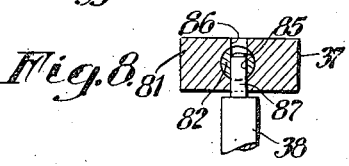
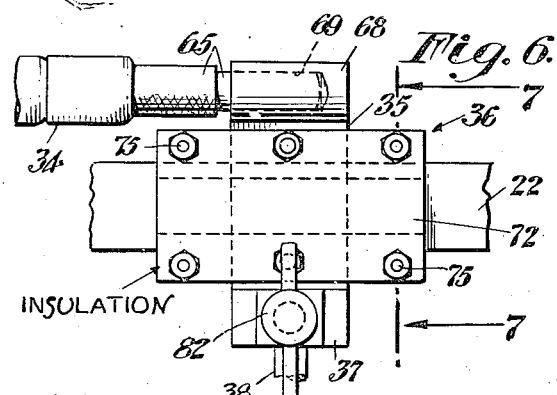
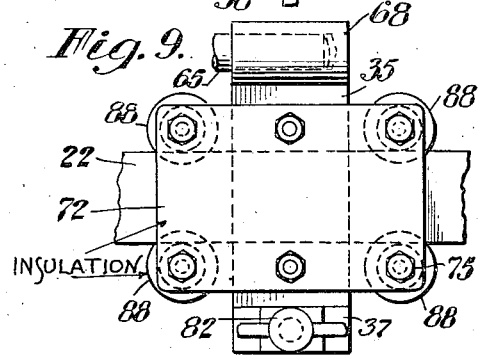  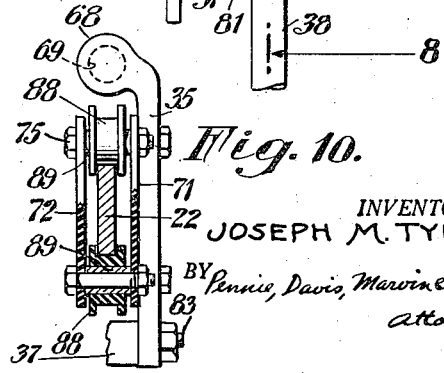
INVENTOR.
JOSEPH M. TYRNER
BY Pennie, Davis, Marvin & Edmonds
Attorneys Dec. 17, 1946.                J. M. TYRNER                2,412,660
                   GRAVITY-FEED ARC-WELDING APPARATUS
                   Filed July 7, 1944          3 Sheets-Sheet 3
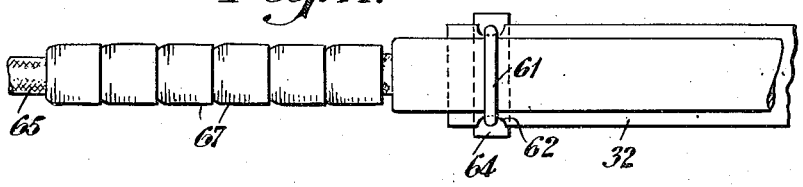
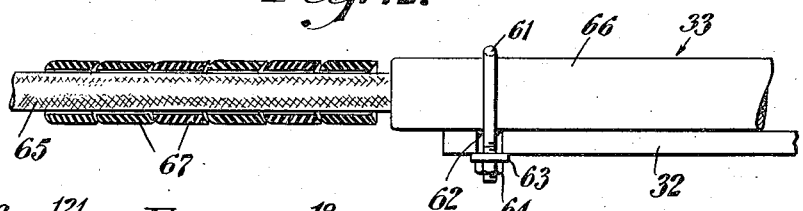
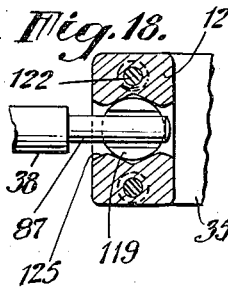
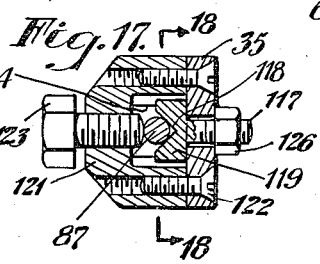
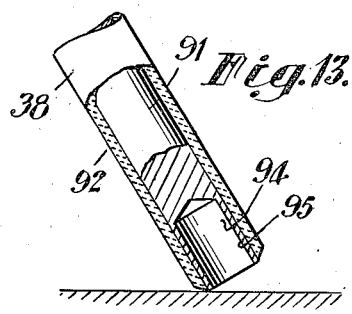
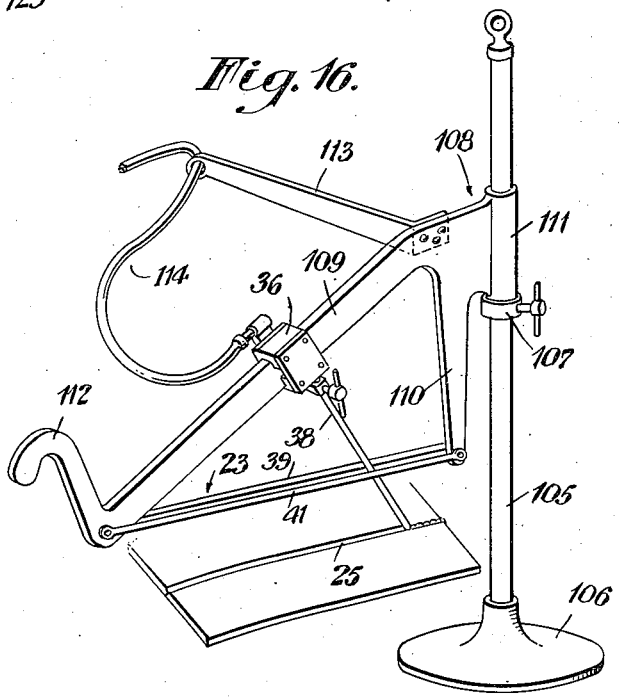
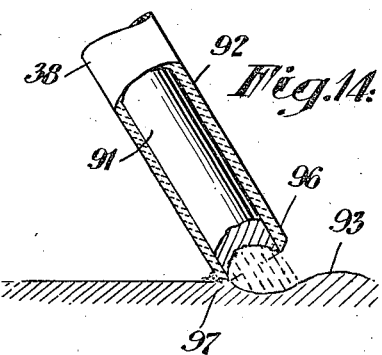
INVENTOR.
JOSEPH M. TYRNER
BY Pennie, Davis, Marvin & Edmonds
                    Attorneys Patented Dec. 17, 1946

2,412,660

UNITED STATES PATENT OFFICE 2,412,660

GRAVITY-FEED ARC-WELDING APPARATUS

Joseph M. Tyrner, New York, N. Y., assignor to Air Reduction Company, Incorporated, New York, N. Y., a corporation of New York Application July 7, 1944, Serial No. 543,883

7 Claims. (Cl. 219—8)

This invention relates to a gravity-feed arc-welding apparatus and more particularly to a more or less portable type of such apparatus.

It is the object of the present invention to provide a gravity-feed arc-welding apparatus wherein the welding material is fed along the line of weld automatically as the welding rod and its holder are allowed to follow down an incline or slide due to the force of gravity as the welding rod is being used up.

It is another object of the invention to provide in such a type of welding apparatus guiding means so located adjacent the leading end of the welding rod as to accurately maintain the welding rod on the line of weld.

According to the present invention, there is provided a frame of triangular shape including a slide part or incline, a guide part and a third side. On the slide part there is connected for slidable movement a welding rod holder containing the welding rod which extends downwardly past the guiding part and into contact with the work. The frame is supported on edge and so that the guiding part runs coextensively along with the line of weld. In one form of the invention, the supporting means comprises three rods arranged in a tripod-like manner and adjustably connected with the frame. The third side has an extension bent over the slide part to serve as a support for a flexible cable which has a looped end connected to the slidable rod holder to provide adequate freedom of movement to the welding rod holder as it traverses the slide part. The guide part comprises laterally spaced rods extending between the lower end of the slide part and the lower end of the third side and the welding rod extends between these two guide rods to prevent the rod from being laterally displaced. Each of the guide rods is connected to the parts of the frame so that they can be adjusted to provide a different spacing between the rods and to accommodate welding rods of different size diameter. The rod holder has its parts which connect with the slide part made of insulating pieces. A conducting plate for feeding the welding current about the holder and for delivery to the rod is carried on the side of the holder. On the bottom end of this conducting plate there is provided a chuck or clamp adapted to rigidly retain the welding rod. One form of the work holder has insulating channelled pieces which fit the slide part while another form of rod holder has insulating rollers engaging the upper and lower edges of the slide part and similarly insulated from the electrical conducting plate 35.

In another form of the invention, the apparatus is supported from the bent-over flexible cable support on the upper end of the frame. Means is provided on the support by which the frame can be connected to suspended chains. Still another form of the invention includes a pedestal and a frame having its third side connected to the pedestal for vertical adjustment with respect thereto. A clamp is provided on the pedestal for holding the frame in its vertically adjusted position.

For other objects and better understanding of the invention, reference may be had to the following detailed description taken in connection with the accompanying drawings, in which Fig. 1 is a perspective view of one form of welding apparatus in position over a work-piece and with the welding operation partly completed;

Figs. 2, 3 and 4 are, respectively, end and cross-sectional views of the double clamp carried on the third side for the connection thereto of two of the vertical rod supports, the cross-section of Figs. 3 and 4 being taken, respectively, on lines 3—3 and 4—4 of Fig. 2;

Fig. 5 is an enlarged detailed view of the adjustable guide rods showing more clearly their connection to the lower ends of the slide part and the third side for adjustment with respect thereto;

Figs. 6 and 7 are, respectively, side and cross-sectional views of one of the slidable welding rod holders, the latter being taken on line 7—7 of Fig. 6;

Fig. 8 is a detailed view taken along the line 8—8 of Fig. 7 showing a section through the welding rod clamp;

Figs. 9 and 10 are, respectively, side and end elevations of the other form of rod holders in which rollers are used, the latter being partly in section;

Figs. 11 and 12 are, respectively, plan and side elevational views of the flexible cable at its point of attachment to the bent-over extension of the frame;

Figs. 13 and 14 are enlarged views of the welding rod showing in the first view the condition of the welding rod prior to current being turned on to start the welding operation and the latter view showing the state of the welding rod after the welding operation has started;

Fig. 15 is a perspective view of a modified form of welding apparatus wherein the same is supported from the bent-over flexible cable support or extension at the top of the frame;

Fig. 16 is still another form of the apparatus, differing from the prior forms in the manner in which the frame is supported over the work, and embodying a pedestal with the frame connected to the pedestal for vertical adjustment with respect thereto and to extend over the work in a cantilever fashion.

Fig. 17 is a cross-sectional view of a modified form of chuck for retaining the welding rod;

Fig. 18 is a cross-sectional view taken generally along the line 18—18 of Fig. 17.

Referring now particularly to Fig. 1, there is a frame 21 of triangular shape having a slide part or incline 22, a guide part 23 and a third side 24. This frame is retained on edge and so that its guiding part 23 runs co-extensively with the line of weld 25 of the work-pieces 26, by means of a single rod 27 located on the forward end of the slide part 22 and a pair of rods 28 and 29 carried by means of an adjustable double clamp 31 on the third side 24.

The third side 24 is connected with its wide face abutting the end of the slide part 22 and has a bent-over extension 32 adapted to support a flexible cable 33 which has a looped end 34 connected with a conducting plate 35 of a rod holder or carriage 36 on the slide part 22. This rod holder 36 is of insulating material so that the conducting plate 35 will not be grounded through the frame 21. On the lower end of the plate 35 is a chuck or clamp 37 for retaining a welding rod 38 which extends down past the guiding part 23 and into contact with the work-pieces 26 along the line of weld 25.

The guiding part 2, includes a pair of spaced rods 39 and 41, Fig. 5, between which the welding rod 38 is extended and retained against lateral displacement of the welding rod close to its point of contact with the line of weld. On the lower end of the third side 24 is an inwardly extending lug or bracket 42 to which the guide rods 39 and 41 are connected. The connection with this bracket 42 is such as to permit different spacings of the guide rods 39 and 41 depending upon the diameter of the welding rod and upon the amount of lateral play to be allowed to the welding rod while the same is traversing through the space between the guide rods. This connection comprises a bolt 43 extending through the bracket 42 on which there is provided, respectively, at opposite sides of the bracket 42 springs 44 and 45 and a nut 46 on the end of the bolt. As the nut 46 is turned on the bolt, the guide rods, which have their ends fashioned to fit on the bolt externally of the springs, are simultaneously adjusted and the spacing between the guide rods is thereby varied. A similar connection for the guide rods is made to the lower end of the slide part 22 as shown at 47 of Fig. 5.

The single rod support 27 is connected to the lower end of the slide part 22 so as to extend through a clamp 48 containing a clamping screw 49. By untightening the screw 49, the support 27 can be adjusted on the frame. The double clamp 31 is utilized on the third side 24 for adjustably connecting the vertical supports 28 and 29 thereto and it includes a plurality of clamping plates 51, 52, 53, 54 and 55 retained on two bolts 56 extending axially through the plates. The plates 52 and 53 are, respectively, located on opposite sides of the third side 24. The plates 51 and 52 contain the support 28 and the plates 53 and 54 contain the support 29. On the plate 55 is a clamping screw 57 adapted to bear against plate 54 upon being tightened so that the looseness of the parts on the bolts 56 is taken up and the adjustable supports 28 and 29 made fast to the frame in their adjusted positions.

The cable 33 is connected to the support 32 by means of U-bolts 61 extending through openings 62 in the bent-down extension 32 and having plate 63 and nuts 64 for effecting the clamping action of the bolt 61. The conducting part of the cable may be of stranded wire 65 with a continuous covering 66 and on that part of the wire 65 which forms the loop 34 is a series of insulating beads 67.

The conducting plate 35 has an enlarged portion 68 with a hole 69 through which the end of the cable 65 is projected and soldered to the conducting plate. This conducting plate 35 extends downwardly along the side of one of a pair of vertically extending insulating plates or pieces 71 and 72 located, respectively, at opposite sides of the slide part 22 and retained in spaced relation by channeled insulating pieces 73 and 74 matching, respectively, with upper and lower edges of the slide 22. Bolts 75 extend through the insulating pieces to provide a self-contained welding rod holder adapted to slide down the slide part 22 upon welding action being started and due to the force of gravity thereon.

On the lower end of the conducting plate 35 is a chuck 37 which includes a main part 81 and a manually aligned member 82 having a threaded outer end 83 extending through a nut 84 on the outer face of the conducting plate 35, Figs. 7 and 8. In the shank of the manually aligned member 82 is an opening 85 adapted to be aligned with an opening 86 in the main part 81. When these openings are so aligned as by manual adjustment of the member 82, a metal projection 87 of the welding rod is fitted into these openings and the clamping nut 84 is turned to axially move member 82 and secure the welding rod to the main part 81.

In the modified form of welding rod holder shown in Figs. 9 and 10, the parts thereof are similarly arranged but, instead of having channeled pieces 73, there are provided four insulating rollers 88, one at each corner of the insulating plates 71 and 72, and adapted to ride over the upper and lower edges of the slide 22. These rollers are carried on sleeves 89 which serve to maintain the plates 71 and 72 in spaced relationship upon the bolts 75 being tightened.

Referring now to Figs. 13 and 14, the condition of the welding rod is shown, respectively, before and after the welding operation has started. The welding operation starts automatically upon current being supplied through the flexible cable 33 to the welding rod holder and to the rod. The rod itself includes a central core of welding material 91 and an outer coating of fusible material 92 which serves during the welding operation to insulate the metal core 91 from the work-piece to provide adequate spacing for the formation of the welding material upon the line of weld and to maintain the arc between the rod and the work-piece. The rod may be perpendicular to the slide part 22 but other angles may be used as this angle controls the amount of deposit per unit length of bead or weld. The end of the rod is inclined with the work surface. The coating material thus only engages the work-piece at one side, thereby leaving the opposite side of the rod spaced from the work-piece and free to deposit the weld material 93 upon the line of weld.

The welding rod or electrode has a hole 94 drilled in its contacting end to provide only a thin sleeve 95 of welding material which is very quickly melted under the heavy current which is passed to the welding rod. Upon starting the welding action, this portion 95 is melted and the rod is dropped down to take the position shown in Fig. 14. From this instant, the movement of the rod across the line of weld is automatic. The rod has a crater 96 formed in its end from which the welding material is continually derived. The coating melts under the high heat of the arc and provides particularly along the forward edge 97 of the end of the rod an insulating coating or crucible, over the work-piece surface and around the arc, on which the welding rod rests. The rod holder 36 with the rod 38 will continue in its movement until the rod 38 is practically used up and the holder has reached the lower end of the slide part 22. All the while the rod is guided and held against lateral or transverse displacement by rods 39 and 41. The faster the welding rod burns the shorter the time of travel of the holder to the lower end of the slide part.

Referring now to the form of the invention shown in Fig. 15, frame 21 is supported from suspended chains 101 and 102 connecting, respectively, with flexible cable holders 103 secured over the flexible cable 33 to connect the same to the bent portion 32. In this manner the frame 21 is retained on edge and so that the guiding part 23 runs co-extensively with the work-piece 26. Since the flexible cable 33 is insulated at its point of connection with the frame, the operator may steady the frame by direct handling of the frame to either maintain it vertically on a line of weld or to maintain it tilted sideways to make a fillet weld as in the case of a plate that meets another plate at right angles.

Referring now to the form of the invention shown in Fig. 16, there is provided a pedestal 105 including a base 106 and a clamp 107 vertically adjustable on the pedestal to locate a frame 108 in an adjusted position over the work-pieces 26. The frame 108 has its slide part 109 and third side 110 fashioned from plate stock and has a sleeve 111 slidable on the pedestal 105 and adapted to be supported by the clamp 107. On the lower end of the slide part 109 is a vertically extending projection 112 serving as a handle and as a stop for the rod holder 36. With this handle 112 the operator may manually maintain the welding rod 38 on a curved line of weld. The guide part 23 includes the same pair of guide rods 39 and 41 connected to the lower end of the slide part 109 and the lower end of the dependent part 110. The frame 108 carries a bracket 113 from which a flexible cable 114 is supported. Sufficient loop is provided in this cable 114 so that the holder 36 may freely slide down the slide part 109 without being hampered by the cable.

Referring to Figs. 17 and 18, there is a modified form of chuck which permits a greater range of adjustment of the angle of the rod than the chuck shown in Figs. 7 and 8. This chuck includes an attaching bolt 117 extending through the conductor plate 35 and has a V-notch 118 in its enlarged head 119 to receive the metal projection 87 of the rod. A second chuck member 121 is fastened to plate 35 by screws 122 so that its bolt 123 can clamp the projection 87 to the V-notch 118. The chuck member 121 has an opening 124 through it which is relieved as indicated at 125 to allow clearance for the angular adjustment of the rod. The enlarged head 119 can rotate when nut 126 is loosened.

It should now be apparent that there has been provided a gravity-feed arc-welding apparatus of a portable type adapted to automatically feed the welding rod material to the line of weld without the help of the operator.

I claim:

1. A gravity-feed arc-welding apparatus comprising a frame of triangular shape including a slide part, a guiding part and a third side, means for supporting the frame so that the guiding part will lie substantially parallel with the portion of the work-piece to be welded and the slide part vertically inclined over the guide part, a welding rod holder connected to the slide part to slide down the same due to force of gravity thereupon, a welding rod carried in the holder to move therewith and extending past the guide part and into contact with the work, said holder and the rod moving down the slide part as rod material from the contacting end of the rod is deposited on the work-piece, said guide part being a pair of spaced parallel rods, adjustable means for connecting the rods to the lower end of the slide part and the lower end of the third side so as to permit the rods to be adjusted toward and away from each other to accommodate different size welding rods or alter the permissible sidewise play for a given welding rod, said third side having an inwardly extending lug, said adjustable means comprising bolts extending through the rod ends and the slide part or third side part to which the rods are connected, and coil springs on each bolt, one at each side of the slide part or third side lug, to maintain the rod ends equally spaced therefrom as the bolts are adjusted to vary the spacing between the rods, said welding rod extending between the spaced guide rods so as to be allowed only limited sidewise movement and be generally maintained along the line of weld during the welding operation.

2. A gravity-feed arc-welding apparatus comprising a frame of triangular shape having a slide part and a guide part, means for supporting the frame on edge so that the guiding part will lie substantially parallel with the work-piece and the slide part vertically inclined over the guide part, an electrically insulated welding rod holder connected to the slide part so as to be slidable down the same due to the force of gravity thereupon, a welding rod carried by the rod holder and extending past the guiding part and into contact with the work, said guide part serving to hold the rod against sidewise movement during the welding operation, a flexible cable connected to the rod holder for delivering welding current to the welding rod, means on the frame for supporting the flexible cable above the slide part, said cable being adapted to provide a loop between the supporting means and holder, in front of the holder, to free the holder for sliding movement down the sliding part.

3. A gravity-feed arc-welding apparatus comprising a frame of triangular shape having a slide part, a guide part and a third side, means for supporting the frame on edge so that the guiding part will lie parallel to the work and the slide part vertically inclined over the work, an electrically insulated welding rod holder connected to the slide part so as to be slidable down the same due to the force of gravity thereupon, a welding rod carried by the rod holder and extending past the guide part to be guided by the same and into contact with the work, said third side having an extension which projects over the slide part, and a flexible cable supported on said extension and provided with a looped end connected to the rod holder and lying in front thereof.

4. A gravity-feed arc-welding apparatus comprising a frame of triangular shape having a slide part, a third side for supporting the upper end of the slide part, and a guide part extending between the lower end of the slide part and the lower end of the third side, a welding rod holder connected to the slide part so as to be slidable down the same due to the force of gravity thereupon, a welding rod carried by the rod holder and extending past the guide part to be guided by the same and into contact with the work, means for supporting the frame on edge with the guide part running substantially parallel with the work, said supporting means including a single rod support connected to the lower end of the slide part for vertical adjustment with respect thereto and a pair of downwardly diverging rods and double clamp means for connecting the same to the third side for vertical adjustment with respect thereto, which when taken with said single rod support provide a tripod-like arrangement for supporting the frame for vertical adjustment with respect to the work.

5. A gravity-feed arc-welding apparatus comprising a frame of triangular shape having a slide part and a third side for supporting the upper end of the slide part and a guide part extending between the lower end of the slide part and the lower end of the third side, a welding rod holder connected to the slide part so as to be slidable down the same due to the force of gravity thereupon, a welding rod carried by the rod holder and extending past the guide part to be guided by the same and into contact with the work, said third side having an extension, which projects over the slide part, a flexible cable supported on said extension and provided with a looped end connected to the rod holder, and means provided on said extension by which the frame can be suspended from a supporting device located above the frame.

6. A slide frame of triangular shape for a gravity-feed arc-welding apparatus including a wide thin strip with an inner side face, a relatively thick slide piece extending normal to the strip side face and secured by its upper end edge to the wide strip face, said wide thin strip having an extension bent down flatwise over the slide piece, said thin strip having an inwardly extending lug also extending normal to the wide inner strip side face and a guide part extending between the lug of the wide thin strip and the slide piece.

7. A gravity-feed arc-welding apparatus comprising a frame of substantially triangular shape having a forwardly inclined slide part and depending side part, a pedestal for supporting the frame, means extending along the depending side part connected to the pedestal for vertical adjustment with respect thereto, means on the pedestal for retaining the frame in its vertically adjusted position, a guide rod extending between the lower ends of the slide and depending parts, a welding rod holder connected to the slide part to slide down the same due to the force of gravity thereupon, a welding rod carried by the rod holder and adapted to extend past the guide rod and into contact with the work, said rod and holder being movable down the slide part as rod material from the contacting end of the rod is deposited on the work.

JOSEPH M. TYRNER.